Sept. 20, 1932. E. P. CRESSLER 1,878,113
MOUNT FOR FILMS
Filed July 28, 1928 2 Sheets-Sheet 1

Inventor
Edward P. Cressler
By
Attorney

Sept. 20, 1932.  E. P. CRESSLER  1,878,113
MOUNT FOR FILMS
Filed July 28, 1928  2 Sheets-Sheet 2
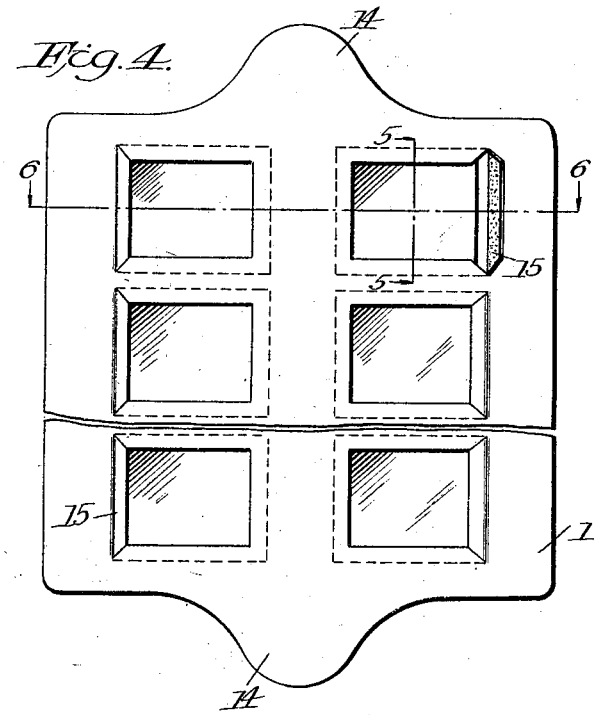
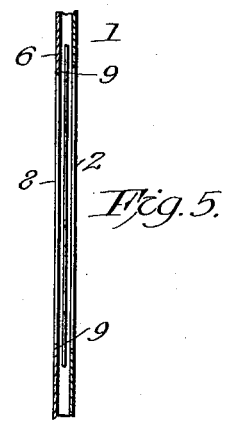
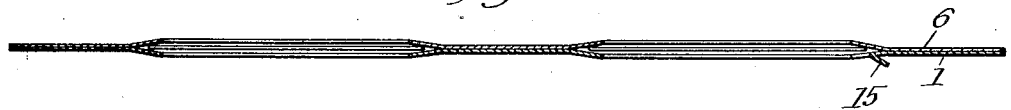
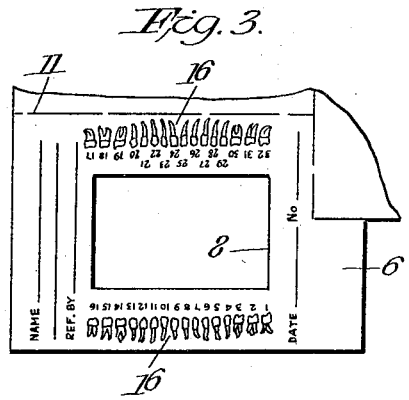
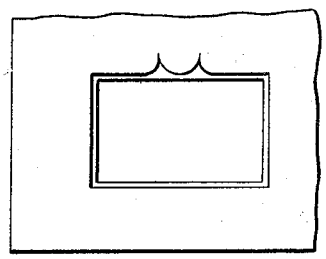
Inventor
Edward P. Cressler,
By
Attorney Patented Sept. 20, 1932

1,878,113

UNITED STATES PATENT OFFICE

EDWARD P. CRESSLER, OF NEWTON, KANSAS

MOUNT FOR FILMS

Application filed July 28, 1928. Serial No. 295,997.

This invention relates to mounts for films and particularly to such mounts as are adapted to be used in connection with X-ray films.

In modern dentistry, the use of the X-ray is becoming more important and more prevalent to determine, with the necessary accuracy, the condition of a patient's mouth and teeth, and it has been found that the best results are obtained when the pictures are taken in pairs and viewed through a stereoscope. In my co-pending application Serial No. 227,272, filed October 19, 1927, I have shown and described certain improvements in stereoscopes and also in mounts for X-ray films to be used in connection therewith.

The subject-matter of the present application has reference to a mount for X-ray films particularly adapted for use with the above-referred to machine.

The principal object of this invention is to provide a simple and convenient mount for X-ray films and the like upon which films may be mounted in pairs for stereoscopic views.

Another object of the invention is to provide a mount for X-ray films with a plurality of openings or windows in each of which a film may be mounted, the openings or windows being arranged in pairs so that the distance from center to center of adjacent openings will be the proper distance for stereoscopic views.

A further object of the invention is to provide a mount having a plurality of pairs of openings so arranged that smaller mounts may be cut therefrom having any desired number of openings arranged in any desired manner, whether for stereoscopic or single views.

Still another object of the invention is to provide a mount for X-ray films and the like comprising a facing-sheet and a backing-sheet provided with registering openings, the backing-sheet being adhesively coated and secured to the facing sheet, for example, along a median line, the remainder being free and adapted to be secured to the facing sheet as the films are mounted.

It is also an object of the invention to provide a mount having a plurality of openings or windows as above set forth, wherein slits are provided adjacent an edge of each opening, the slits serving to hold the film in place while the backing is being pasted down.

Another object is to provide a mount as above set forth in which the backing-sheet carries appropriate indicia at each opening or window to properly identify the subject-matter of the film mounted therein.

Other objects of my invention will be more fully brought out as the description proceeds, and it is thought that the many advantages thereof will readily become apparent.

In the accompanying drawings, I have illustrated two practical embodiments of my invention; but it is to be understood that the drawings are illustrative, merely, and are not to be construed as limiting the invention to the details of construction therein disclosed, except as defined in the appended claims. Many modifications will readily suggest themselves which may be made without departing from the salient features of the invention or sacrificing any of its advantages.

In these drawings:

Fig. 3 is a view on an enlarged scale of a portion of the back of the mount;

Fig. 4 is a front view of a modified form of mount adapted particularly for use with a stereoscope having a view-changing attachment;

Fig. 5 is a sectional view, taken on line 5—5 of Fig. 4, the parts of the mount being enlarged for the sake of clearness;

Fig. 6 is a sectional view, on line 6—6 of Fig. 4, on an enlarged scale; and

Fig. 7 is a fragmentary view of a mount illustrating a modified form of the slits at the edge of the openings.

Figure 1:
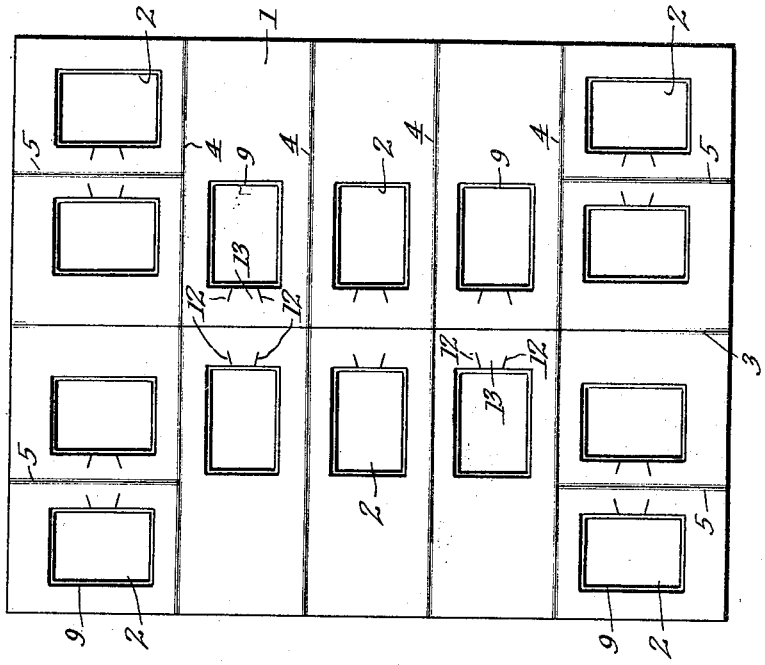
Fig. 1 is a front view of a mount constructed in accordance with my invention.

Referring now to the drawings, the reference-numeral 1 indicates the facing-sheet of my mount, which may be made of any desired material such as medium-weight cardboard generally used in the mounting of photographs. The facing is provided with a plurality of cut-out windows or openings 2 in which X-ray films are to mounted.

The facing-sheet may be of any desired size so as to provide any desired number of windows or openings. Whatever the number of openings may be, I prefer to arrange them in pairs, as illustrated in the drawings, so that the openings constituting a pair may be used for the mounting either of pictures of different teeth or similar pictures of the same tooth, the latter being followed when the pictures are to be viewed through a stereoscope. For this purpose, the openings of each pair are spaced the proper distance for stereoscopic views, generally two and one-half inches. For example, in Fig. 1, the openings or windows are arranged with reference to a center line 3, the openings on opposite sides of that line being two and one-half inches apart. Thus, in this figure there are five pairs of openings arranged for stereoscopic views, leaving an opening in each corner of the card which may be utilized for the mounting of a single picture or film.

When it is not necessary to use an entire mount for one "case"—that is, for one patient—a smaller mount containing the required number of openings may be cut from the larger mount. To facilitate cutting into smaller mounts, I have provided the facing-sheet with score-lines 4 and 5 so arranged that the mount may be cut into smaller sections containing one or more pairs of openings for stereoscopic views or one or more single openings, as desired.

To maintain the films or pictures in place on the mount, I have provided a backing-sheet 6 made of paper and coated with adhesive by which it is to be secured to the facing-sheet. In the embodiment illustrated in Figs. 1 and 2, the backing-sheet is secured to the facing-sheet only along the medial line 7, the remainder of the backing-sheet being free and adapted to be pasted to the facing-sheet as the films are put in place in the openings.

Figure 2:
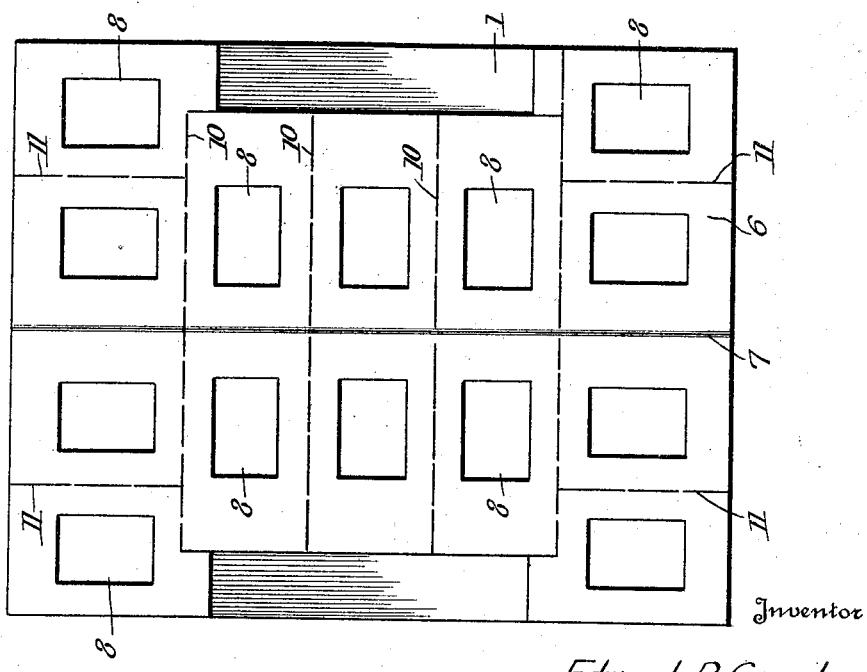
Fig. 2 is a rear view thereof.

As will be noted from an inspection of Fig. 2, the backing-sheet is provided with windows or openings 8 in register with the openings 2 in the facing-sheet. I prefer to make the openings in the backing-sheet slightly smaller than those in the facing-sheet, thus providing a frame 9 around the edges of the openings as viewed from the front (Fig. 1). However, the arrangement may be the reverse, or the openings may be of the same size.

The backing-sheet is perforated or slit along lines 10 and 11 coinciding, respectively, with the score lines 4 and 5 in the facing-sheet. By this arrangement, the films may be mounted one at a time and the sections of the backing-sheet separately pasted down.

To prevent displacement of the films or pictures, each opening in the facing-sheet is provided with a pair of slits 12 forming a tab or tongue 13 which underlies the film. In Fig. 1 the slits 12 are shown as straight lines converging toward the opening, while in the modified form illustrated in Fig. 7, the slits are shown as rounded off for more ready insertion of the film.

The form illustrated in Fig. 4 is that which is disclosed in my co-pending application above referred to. It is essentially the same as the form illustrated in Fig. 1 except that reduced portions or tongues 14 are provided to facilitate the insertion of the mount between the rollers of a view-changing attachment for stereoscopes, such as that disclosed in the said co-pending application. Also, in this form the backing-sheet is secured to the facing-sheet over its entire area except for a narrow portion around the periphery of the openings, thus providing a plurality of pockets into which the films or pictures are inserted. To facilitate insertion of the films, a cut-out tab 15 is provided at one edge of each opening which as adapted to be bent out of the plane of the mount and subsequently pasted down to secure the film in place.

In each of the forms described it is desirable to provide indicia 16 to identify the subject-matter of the film or picture. The indicia is printed or otherwise inscribed on the backing-sheet, as illustrated in Fig. 3, and may be in the form of a diagrammatic representation of the teeth, numbered in the usual manner. The tooth or teeth forming the subject-matter of the picture will be indicated upon the diagram, for example, by a check-mark.

From the foregoing description of my invention, it will be clear that I have provided a very simple mount for X-ray films or other pictures, which may be cheaply manufactured and marketed. My mount also possesses the advantages that it may be utilized for stereopticon views as well as for ordinary purposes, and may be made of such sizes as to accommodate all the necessary views of a single "case," and may be cut into smaller mounts without wasting material.

What I claim is:

1. A film-mount comprising a facing-sheet and a backing-sheet secured together along a median line and provided with registering openings in which films are to be mounted, said backing-sheet being perforated between adjacent openings on either side of said median line, whereby films may be independently mounted in each opening, and means to secure of the films in place.

2. A film mount comprising a facing-sheet and a backing-sheet provided with a plurality of registering openings in which films are to be mounted, said facing-sheet and said backing-sheet being secured together over only a portion of their extent, means to secure the films in place, the backing-sheet being perforated between adjacent openings to provide separate sections of the backing-sheet for each film whereby films may be independently mounted in each opening.

3. A film mount comprising a facing-sheet and a backing-sheet provided with a plurality of registering openings in which films are to be mounted, said facing-sheet and said backing-sheet being secured together over only a portion of their extent, said backing-sheet being perforated between adjacent openings to provide independent portions of the backing-sheet for each film, indicia on each of said sections to indicate the subject-matter of the film mounted therein, and an adhesive surface on one of said sheets for securing the same to the other sheet whereby the films may be retained in place.

4. A film mount comprising a sheet provided with a plurality of openings arranged in pairs along a median line so that the respective pairs may be successively viewed stereoscopically, a second sheet provided with openings registering with the openings of the first sheet secured to said first sheet along its median line in such manner as to permit the insertion of films between the two sheets, and an adhesive coating on one of said sheets so that films may be secured between the sheets in said openings.

5. A film mount comprising a sheet provided with a plurality of openings arranged in pairs along a median line so that the respective pairs may be successively viewed stereoscopically, a second sheet provided with openings registering with the openings of the first sheet secured over a portion of its surface to said first sheet in such manner as to permit the insertion of films between the two sheets and an adhesive coating on one of said sheets so that films may be secured between the sheets in said openings, one of said sheets being perforated between adjacent openings to provide separate sections whereby films may be independently mounted in each opening.

In testimony whereof I affix my signature.

EDWARD P. CRESSLER.